US012571423B2

(12) United States Patent
Köching

(10) Patent No.: US 12,571,423 B2
(45) Date of Patent: Mar. 10, 2026

(54) LINEAR SLIDING BEARING WITH A SNAP-ON CARRIAGE

(71) Applicant: igus SE & Co. KG, Cologne (DE)

(72) Inventor: Fabian Köching, Rhede (DE)

( * ) Notice: Subject to any disclaimer, the term of this patent is extended or adjusted under 35 U.S.C. 154(b) by 0 days.

(21) Appl. No.: 18/697,287

(22) PCT Filed: Sep. 23, 2022

(86) PCT No.: PCT/EP2022/076495

§ 371 (c)(1),
(2) Date: Mar. 29, 2024

(87) PCT Pub. No.: WO2023/052258

PCT Pub. Date: Apr. 6, 2023

(65) Prior Publication Data

US 2024/0392831 A1     Nov. 28, 2024

(30) Foreign Application Priority Data

Oct. 1, 2021    (DE) ..................... 20 2021 105 329.3
Apr. 11, 2022    (DE) ..................... 20 2022 101 946.0

(51) Int. Cl.
*F16C 29/02* (2006.01)
*F16C 29/00* (2006.01)
(Continued)

(52) U.S. Cl.
CPC ............ *F16C 29/004* (2013.01); *F16C 29/02* (2013.01); *F16C 29/10* (2013.01); *F16C 43/02* (2013.01); *F16C 2226/70* (2013.01)

(58) Field of Classification Search
CPC ........ F16C 29/004; F16C 29/02; F16C 29/10; F16C 43/02; F16C 2226/70
See application file for complete search history.

(56) References Cited

U.S. PATENT DOCUMENTS 3,574,468 A    4/1971    Herman
6,179,468 B1 *  1/2001    Thorstens ............... F16C 29/02
                                                                      384/40
(Continued)

FOREIGN PATENT DOCUMENTS

DE          818295 B      10/1951
DE          9417994 U1    4/1995
(Continued)

OTHER PUBLICATIONS

Deutsches Patent—und Markenamt, Search Report for German patent application No. DE20 2022 101 946.0, Nov. 8, 2022, pp. 1-8.
(Continued)

*Primary Examiner* — Phillip A Johnson
(74) *Attorney, Agent, or Firm* — Cahn & Samuels, LLP

(57) ABSTRACT

A sliding bearing 1 includes a rail 2 and a carriage 3. The rail 2 has two guide portions 21, 22 that are elongated in a longitudinal direction X and extend next to one another. The carriage 3 has a guide seat 31, 32 assigned to each guide portion 21, 22. In an operating state each of the guide portions 21, 22 is arranged in the guide seat 31, 32, respectively, assigned to it and is surrounded by it perpendicularly to the longitudinal direction X while fixing the carriage 3 relative to the rail 2 perpendicularly to the longitudinal axis X and while ensuring a longitudinal displaceability of the carriage 3 relative to the rail 2.

22 Claims, 6 Drawing Sheets

Figure 1A:
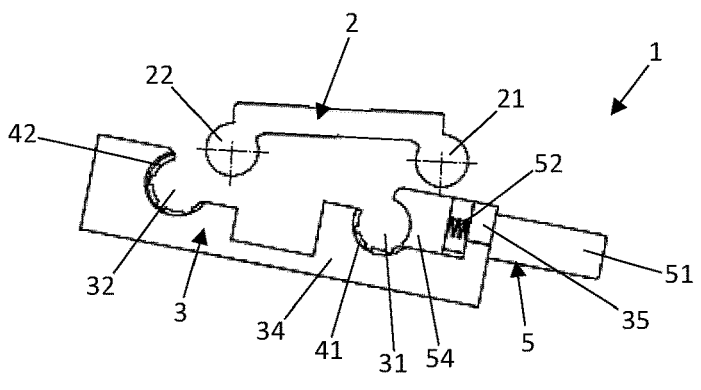
Figure 1B:
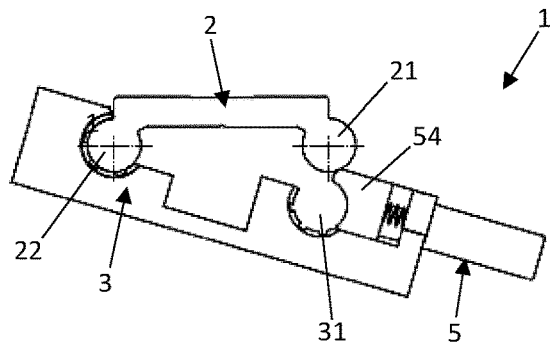

(51) Int. Cl.
    *F16C 29/10*      (2006.01)
    *F16C 43/02*      (2006.01)

(56)              References Cited

U.S. PATENT DOCUMENTS

| | | | |
|---|---|---|---|
| 2010/0074711 A1 | 3/2010 | Moshammer | |
| 2014/0321778 A1* | 10/2014 | Buchmann | F16C 29/10 |
| | | | 384/26 |

FOREIGN PATENT DOCUMENTS

| | | | |
|---|---|---|---|
| DE | 29802037 U1 | 5/1998 | |
| DE | 202008012504 U1 | 1/2009 | |
| JP | 2014-149034 A | 8/2014 | |
| WO | 99/39772 A1 | 8/1999 | |
| WO | WO-2009122712 A1 * | 10/2009 | F16C 29/02 |

OTHER PUBLICATIONS

European Patent Office, International Search Report and Written Opinion for PCT application No. PCT/ EP2022/076495, Dec. 20, 2022, pp. 1-15.

European Patent Office, Preliminary Report on Patentability for PCT application No. PCT/EP2022/076495, Oct. 10, 2023, pp. 1-30.

European Patent Office, English abstract for JP2014149034A, retrieved Mar. 29, 2024.

The International Bureau of WIPO, Preliminary Report on Patentability for PCT application No. PCT/EP2022/076495, Apr. 4, 2024, pp. 1-6.

\* cited by examiner

A–A

LINEAR SLIDING BEARING WITH A SNAP-ON CARRIAGE

The invention relates to a sliding bearing with a rail and a carriage, a carriage of such a sliding bearing and a use of such a sliding bearing.

Sliding bearings of the type concerned are well known in prior art and are used for slidingly guiding working devices, in particular as linear guides. Depending on the field of application, such working devices can have a wide variety of properties. For example, such working devices can be elements of tools. For example, such working devices can be holding devices, e.g. for displays, via which elements can be mounted in a displaceable manner as easily as possible. It is always important that the sliding bearing enables the working device attached to it to be guided along a rail with as little friction and as little wear as possible. At the same time, the working device should be reliably held on the rail. The invention relates in particular to sliding bearings that are used in vehicle construction, in particular in utility vehicles such as tractors and cleaning vehicles. In such utility vehicles, it is often desirable for a working device to be mounted in a simple manner in the cockpit so as to be displaceable along a longitudinal direction. To ensure simple and reliable mounting of the working device, the sliding bearing is usually permanently installed in the vehicle by fastening the sliding bearing rail to a part of the vehicle, whereas the working device is detachably fastened to the carriage, for which purpose corresponding fastening devices are provided on the carriage and the working device. However, the fastening devices known in the prior art only insufficiently meet the requirements of ensuring a detachable fastening of a working device to the carriage in a space-saving manner and easy to operate.

Out of the DE 94 17 994 U1, a clamp and breaking device for a linear guide is known. Out of the U.S. Pat. No. 3,574,468 A, an optical bank with a prismatic guide rail is known, wherein the guide rail is embraced by a carriage which can be locked with respect to the guide rail. Further state of the art is described in the US 2010/074711 A1.

The present invention is based on the problem of providing a sliding bearing, a carriage for such a sliding bearing and a use of such a sliding bearing, with which at least one problem of generic sliding bearings is at least partially solved.

As a solution to the present problem on which the invention is based, the invention proposes a sliding bearing having the features according to claim 1. The sliding bearing comprises a rail and a carriage. The rail is elongated in a longitudinal direction to allow the carriage to be displaced along the rail in the longitudinal direction. The rail has two longitudinally elongated guide portions extending side by side. The guide portions are thus spaced apart from one another in a transverse direction perpendicular to the longitudinal direction. The provision of at least two guide portions extending side by side is beneficial for the reliable guidance of the carriage on the rail. The carriage has a guide seat assigned to each guide portion. A first guide seat of the carriage is thus assigned to a first guide portion of the rail and a second guide seat of the carriage is assigned to a second guide portion of the rail. Since a sliding bearing according to the invention is an arrangement comprising a rail and a carriage, the rail and the carriage are designed with their guide portions or guide seats specifically corresponding to one another, so that in an operating state of this arrangement the carriage is held fixed in position relative to the rail in any directions perpendicular to the longitudinal direction, but is displaceable relative to the rail in the longitudinal direction. Usually, the carriage is held on the rail in the operating state in such a way that it can be displaced in the longitudinal direction relative to the rail with as little friction as possible. For this purpose, the guide seat of the carriage in the operating state is usually in sliding contact with the associated guide portion of the rail, either directly, in that the guide portion or guide seat are made of a sliding material, or indirectly, in that a sliding element is provided in the guide seat, which sliding element is fixed in position relative to the guide seat and, when the carriage is displaced relative to the rail, slides along in contact with the associated guide portion of the rail. The guide seat can, for example, abut directly against the guide portion in sections and indirectly against the guide portion in sections. In the described operating state, each of the guide portions is arranged in the guide seat assigned to it and is surrounded by it perpendicularly to the longitudinal direction, fixing the carriage relative to the rail perpendicularly to the longitudinal axis and ensuring longitudinal displaceability of the carriage relative to the rail. In this case, the guide seat engages around the assigned guide portion at least to such an extent that the position of the carriage relative to the rail perpendicular to the longitudinal direction is fixed in the operating state by the two guide seats engaging around the two guide portions. Preferably, each of the guide portions has a guide axis along which it extends in the longitudinal direction, in particular in the manner of a cylinder. Preferably, each guide seat engages around the guide portion assigned to it over at least 180° about its guide axis, particularly preferably at least one of the guide seats engages around the associated guide portion over at least 200°, particularly at least 220° about its guide axis. Preferably, at least the first guide portion, in particular the first and second guide portions, is/are designed in the manner of a cylinder with a round, in particular circular, cross-section. According to the invention, the carriage has a carriage body and an actuating arm, which together form the first guide seat of the carriage. Thus the carriage body and the actuating arm each form a receiving part of the guide seat, with which they each engage around a part of the first guide portion in the operating state. Preferably, the receiving part formed by the carriage body engages around the guide portion over a greater angle around its guide axis than the guide part formed by the actuating arm. Preferably, both receiving parts engage around the first guide portion over an angular range of at least 30° around its guide axis. Preferably, the actuating arm constitutes at least 10%, in particular at least 20%, in particular between 10% and 30% of the area with which the first guide seat faces the first guide portion in the operating state, surrounding the latter. The actuating arm is fixed to the carriage body so as to be displaceable relative thereto perpendicularly to the longitudinal direction for enabling opening of the first guide seat by displacement of the actuating arm for removal of the associated first guide portion from the first guide seat along a removal direction extending perpendicularly to the longitudinal direction. The actuating arm is thus displaceable relative to the carriage body perpendicular to the longitudinal direction, in particular in a displacement direction running perpendicular to the longitudinal direction, while being fixed unchanged to the carriage body. The displacement starting from the operating state enables the first guide seat to be opened, which means that such an opening is formed on a side of the first guide seat facing perpendicular to the longitudinal direction and that the first guide portion can be removed from the first guide seat through this opening. Opening the first guide seat can be effected, for example, by enlarging a cross portion of the first guide seat perpendicular to the longitudinal direction by displacing the actuating arm relative to the carriage body while moving apart wall portions of the first guide seat defining the guide and formed on the one hand by the actuating arm and on the other hand by the carriage body, perpendicular to the longitudinal direction, so that a corresponding opening is formed in the wall of the first guide seat. At this point, it should be pointed out that, of course, the first guide seat does not necessarily fully engage around the first guide portion in the operating state, but at least to such an extent that, in interaction with the engagement around the second guide portion of the rail by the second guide seat, the carriage is fixed in its position perpendicular to the longitudinal direction relative to the rail, so that when a relative force is exerted in any direction perpendicular to the longitudinal direction, the carriage cannot be removed from the rail and thus the first guide portion cannot be led out of the first guide seat. Accordingly, the wall of the first guide seat, in the operating state, has at most such openings which do not allow the first guide portion to be passed through perpendicularly to the longitudinal direction. Particularly preferably, the actuating arm is reversibly movably guided relative to the carriage body perpendicular to the longitudinal direction, so that the sliding bearing can be reversibly brought from the operating state into a mounting state in which, as explained, the first guide portion can be removed from the first guide seat perpendicular to the longitudinal direction and can be brought from the mounting state back into the operating state in which the carriage is fixed perpendicular to the longitudinal direction relative to the rail by inverse displacement.

The invention provides significant advantages over prior art. Whereas in prior art it is assumed that reliable guidance of the carriage relative to the rail requires that the carriage engages around the rail in a way such as to ensure that a working device can be dismounted from the carriage so that the working device can be removed from the location where the sliding bearing is arranged, the invention takes a new approach. The special design of the sliding bearing makes it possible to form the carriage so that it can be removed from the rail and placed back on it, so that the carriage can be permanently mounted on a working device and the working device can be mounted together with the carriage on a rail corresponding to the carriage at the most diverse places of use. In this case, the special design of the carriage in interaction with the rail corresponding to it ensures that the carriage is reliably held on the rail in the operating state despite being easily detachable from the rail and attachable to the rail and is only movable in the longitudinal direction relative to the rail. Large-volume fastening devices on the carriage and the working device, which would allow the working device to be detached from the carriage, can thus be dispensed with. It is essential that the carriage can be removed from or attached to the rail in a direction perpendicular to the longitudinal direction. It is thus not necessary to place the carriage on the rail at a longitudinal end thereof in order to mount the carriage on the rail, but the carriage can be clipped onto the rail at any longitudinal position along the extension of the rail along which it is held longitudinally displaceable relative to the rail in the operating state. Particularly preferably, the actuating arm or an actuating lever provided for actuating the actuating arm protrudes perpendicularly to the longitudinal direction over the body of the carriage so that the actuating arm or the actuating lever forms an end portion of the carriage and can be easily grasped by a person. Particularly preferably, the actuating arm or the actuating lever protrudes relative to the carriage body perpendicular to the longitudinal direction over such a length that is at least half the distance between the guide seats of the carriage perpendicular to the longitudinal direction. Preferably, the guide seats are arranged next to one another in a transverse direction and run with their receiving axes, which are aligned with the guide axes in the operating state, preferably in the longitudinal direction, with the actuating arm or the actuating lever projecting in the transverse direction beyond the carriage body as explained. This can ensure a particularly easy-to-operate design of the actuating arm.

In one embodiment, the carriage body has a base body and a fixing body that are releasably fixed to one another. Preferably, the base body is formed in one piece. Preferably, the fixing body is formed in one piece, but in less preferred embodiments may still be formed in multiple pieces. The base body and the fixing body can be fixed to each other, for example, by means of a screw or by means of a releasable clamp fastener. Preferably, the actuating arm can only be separated from the carriage body after the base body and the fixing body have been detached from each other. The base body and the fixing body thus ensure reliable fixation of the actuating arm to the carriage body. By the carriage body having the base body and the fixing body, the actuating arm can be particularly robustly designed and reliably fixed relative to the carriage body, while in the fixed state it is mounted so as to be movable perpendicular to the longitudinal direction relative to the carriage body.

According to the invention, a guide device is provided between the actuating arm and the carriage body, by means of which the actuating arm is fixed to the carriage body in a displaceably guided manner over a displacement path running perpendicular to the longitudinal direction. The guide device is preferably formed by a first guide part of the carriage body and a second guide part of the fixing arm, the first guide part preferably being formed jointly by the base body and the fixing body of the carriage body. The displacement path preferably runs in a straight line along a straight displacement direction which is perpendicular to the longitudinal direction. According to the invention, the guide part forms a stop defining an end of the displacement path, wherein the actuating arm is displaceable relative to the base body along the displacement path starting from the operating state until the stop is reached. The provision of a guide device providing a stop is particularly advantageous for reliably fixing the actuating arm to the carriage body while ensuring its displaceability relative thereto. Preferably, the actuating arm abuts against the stop in the mounting state described above, in which the first guide portion of the rail can be removed from the first guide seat along the removal direction, and can preferably be reinserted counter to the removal direction. The removal direction can, for example, be a straight or a curved direction. Particularly preferably, the guide device is a linear guide device along a transverse direction perpendicular to the longitudinal direction. Generally preferred, the longitudinal direction and the transverse direction each are a rectilinear direction. Generally preferred, the transverse direction corresponds to the described displacement direction.

When the actuating arm abuts against the stop, an opening of the first guide seat is formed through which the first guide portion can be removed. In this case, the guide seats and the guide portions are preferably designed to correspond to one another in such a way that the second guide portion can be removed from the second guide seat perpendicular to the longitudinal direction only after the first guide portion has been removed from the first guide seat. As the actuating arm prevents removal of the first guide portion from the first guide seat in the operating state, removal of the second guide portion from the second guide seat is thus also prevented. Accordingly, in the mounting state, after the first guide portion has been released, it is possible to remove it from the first guide seat and then to remove the second guide portion from the second guide seat. This cascaded removability is particularly advantageous for achieving simple detachability while at the same time reliably fastening the carriage to the rail in the operating state. This cascaded removability can be ensured, for example, by the two guide seats engaging behind the two guide sections in such a way that the first guide seat engages behind the first guide portion on a first transverse side thereof and the second guide seat engages behind the second guide portion on a second transverse side thereof, the transverse sides facing in opposite directions along the transverse direction.

In one embodiment, the two guide portions each extend along a respective guide axis assigned to them, which extends in the longitudinal direction. When the actuating arm abuts against the stop of the guide, starting from the operating state, the second guide portion is supported in the second guide seat so as to be rotatable about its guide axis, and the first guide portion can be removed from the first guide seat by rotation of the carriage about the guide axis of the second guide portion. The removal direction is thus a direction curved around the guide axis of the second guide portion. The second guide portion is thus basically designed to correspond to the second guide seat in such a way that it is supported in the latter for rotation about its guide axis. However, in the operating state, rotatability of the second guide portion is inhibited in that the first guide portion is arranged in the first guide seat and that the guide seat engages behind the first guide portion. At this point, it should be generally noted that preferably the two guide seats are rigidly connected to each other and the two guide portions are rigidly connected to each other. By ensuring that the first guide portion can be removed from the first guide seat in the assembled state or when the actuating arm abuts against the stop of the guide device, it is possible to rotate the second guide portion while removing the first guide portion from the first guide seat.

The rail has a rail body, wherein the guide portions of the rail are each connected to the rail body via a web portion. The guide seats each have a side opening which is continuous in the longitudinal direction and through which, in the operating state, the web portions extend to the guide portions arranged in the guide seats. The guide seats are preferably of hollow cylindrical design, with the cylinder axis corresponding to their guide axis and running in the longitudinal direction, with the side opening corresponding to a slot in the jacket opening of the hollow cylinder. The hollow cylinder may, for example, have a round, in particular circular, or polygonal, in particular rectangular, cross-section. The web portions have a smaller width than the guide portions in a direction perpendicular to the longitudinal direction, reference being made to the width of the web portion relative to the width of the guide portion assigned to it, which guide portion is connected to the rail body via the web portion. Generally preferably, the rail body extends in the transverse direction between the guide portions. Generally preferably, the web portions extend from the rail body to the respectively assigned guide portion in a direction which is oblique to the longitudinal direction and oblique to the transverse direction, the width being perpendicular to the longitudinal direction and perpendicular to this direction of extension with which they extend respectively from the machine body through the side opening to the associated guide portion. In the operating state, the side opening of the first guide seat has a width which is smaller than the width of the guide portion assigned to it. In contrast, the width of the side opening of the first guide seat is at least the width of the first guide portion when the actuating arm abuts against the stop of the guide. The width in each case denotes, of course, an extension length in a same direction. In the preferred embodiment, the first guide seat can thus be opened by widening the side opening of the first guide seat starting from the operating state. By the width of the side opening being at least the width of the first guide portion, preferably greater than this width, in the mounting state or when the actuating arm abuts against the stop of the guide device, the first guide portion can be easily removed from the first guide seat in this state.

In one embodiment, the guide device comprises a spring device which exerts a spring force on the actuating arm relative to the base body along the displacement path away from the stop. In this embodiment, it is ensured in a particularly advantageous manner that the carriage can be clipped onto the rail and reliably held on the rail in the operating state. The spring device is provided to counteract the displacement of the actuating arm along the displacement path, starting from the operating state. This can prevent the carriage from detaching from the rail in the operating state. In embodiments in which the actuating arm, starting from the operating state, is movable relative to the carriage body in the displacement direction for opening the first guide seat, the spring force exerted by the spring on the actuating arm is opposite to the displacement direction. For example, the spring device may comprise a spring element supported on a support portion of the carriage body which is preferably formed by the fixing body of the carriage body. Preferably, the first guide seat is formed by a first receiving part formed by the actuating arm and a second receiving part formed by the carriage body, wherein the spring element is arranged, preferably in the direction of displacement, between the support portion and the receiving part and is held pressed between the support portion and a further support portion formed by the first receiving par in the direction of displacement. Preferably, the spring element is formed as a spiral spring that extends with its spring axis in the displacement direction. Preferably, the spring force exerted by the spring device on the actuating arm in any of the described states of the carriage is directed toward the seat axis of the first guide seat. In one embodiment, in the operating state, the actuating arm is held pressed against the first guide portion by the spring device with the spring force. In one embodiment, the guide device has a further stop defining an end of the displacement path opposite to said end of the displacement path. Preferably, the actuating arm abuts against said further stop in the operating state. In an embodiment in which the guide device comprises a spring device, the actuating arm is preferably held pressed in the operating state against the further stop by the spring force. Thus, when the carriage is released from the rail and is in a rest position without the effect of an external force, the actuating arm can be reliably fixed to the body of the carriage by the actuating arm being held pressed against the further stop by the spring force.

In one embodiment, the carriage comprises an actuating lever that is mounted to the carriage body for rotation about a bearing axis. The bearing axis is surrounded by the carriage body, in particular by the base body. Preferably, the actuating lever is supported on the bearing axis of the carriage body in such a way that a rotation about the bearing axis is a rotation about a rotation axis whose position relative to the carriage body is fixed unchanged during rotation. The axis of rotation defines the center about which rotation occurs. The actuating lever and the actuating arm of the carriage are designed to correspond to one another in such a way that, starting from the operating state, the actuating arm can be displaced by means of the actuating lever in that the actuating lever is rotated about the bearing axis to enable the guide seat to open as described. The corresponding design of the actuating lever and the actuating arm thus ensures that the described displacement of the actuating arm for enabling the first guide seat to open as described is attainable by rotating the actuating lever. Within the scope of the invention, it was found that the provision of such an actuating lever, which is fixed in its position relative to the carriage body by being supported on the bearing axis of the carriage body, enables a particularly simple and reproducible displacement of the actuating arm, starting from the operating state, to achieve the mounting state. Preferably, the actuating lever is supported on the bearing axis in such a way that its position relative to the carriage body is fixed in such a way that, starting from the operating state, it can be moved relative to the carriage body only by a rotation about the bearing axis. Preferably, the actuating lever has an actuating portion with which it abuts against the actuating arm for performing the displacement of the actuating arm while being rotated about the bearing axis of the carriage body for displacing the actuating arm as explained. Preferably, the actuating lever abuts against the bearing axis of the carriage body via a bearing portion, the actuating portion being spaced from the bearing portion perpendicularly to the bearing axis or perpendicularly to the axis of rotation explained above. Preferably, the actuating lever is supported on the bearing axis of the carriage body in such a way that a rotation of the actuating lever about the bearing axis is necessarily accompanied by a movement of the actuating portion relative to the carriage body in the direction of displacement described above.

In one embodiment, the actuating arm has an actuating contour and the actuating lever has an actuating portion corresponding to the actuating contour. The actuating portion may have the features explained above. By rotating the actuating lever about the bearing axis, the actuating portion is movable along the actuating contour. Preferably, during the rotation of the actuating lever by which the displacement of the actuating arm for opening the guide seat is attained, the actuating portion slides along the actuating contour in contact therewith, in particular exerting a displacement force on the actuating contour in the displacement direction. Preferably, when the first guide seat is open for removal of the associated first guide section, the actuating portion abuts against a first contour portion of the actuating contour. Thus, in the mounting state explained above, the actuating portion abuts against the first contour portion of the actuating contour. Particularly preferably, the actuating portion abuts against the first contour portion with the first guide seat open for removal of the associated first guide portion or in the mounting state with the first contour portion latched to it. Alternatively or additionally, another locking may be provided between the actuating lever and the carriage body and/or the actuating arm in the mounting state or when the first guide seat is open for removing the associated first guide portion. The locking is designed in such a way that, when the locking exists, rotation of the actuating lever about the bearing axis is only possible when a release force is exceeded, wherein, after the release force is exceeded, the actuating lever can be rotated about the bearing axis with a rotation force which is smaller than the release force. The provision of such locking has proved to be particularly advantageous, since the carriage can thereby remain permanently in its mounting state once it has been brought into the mounting state. The carriage can thus be clipped onto the rail in a particularly convenient manner as explained above. After clipping-on, the operating state in which the carriage is held longitudinally displaceable relative to the rail as explained can then be established by applying the release force while disengaging the locking. Another embodiment provides that when the first guide seat is open for the removal of the associated first guide portion or in the mounting state, the actuating portion abuts against the first contour portion in such a way that a restoring force applied in particular by the present spring device acts from the actuating arm on the actuating portion, rather than in the previously described case in which when the first guide seat is open for the removal of the assigned first guide portion or in the mounting state, the actuating portion is locked to the first contour portion in such a way that when such locking exists, a rotation of the actuating lever about the bearing axis is only possible when a releasing force is exceeded. In this case, the restoring force is exerted on the actuating portion in such a way that it acts on a movement of the actuating portion, starting from the mounting state, or when the first guide seat is open for the removal of the associated first guide section, in order to achieve the operating state, in particular it acts on a rotation of the actuating lever counter to the direction of rotation in which the actuating lever is to be brought into the mounting state starting from the operating state. This embodiment has the particular advantage that the actuating lever can be brought into the mounting state, starting from the operating state, only by a force acting externally on it and remains in the mounting state only if this force is at least partially maintained, so that the actuating lever automatically makes a movement by which the carriage changes into its state which it has in the operating state of the sliding bearing, without the action of an external force, starting from the mounting state, or with the first guide seat open for the removal of the associated first guide portion. Thus, the state of the carriage, i.e., the relative arrangement of the components of the carriage, which it holds in the mounting state, is maintained only deliberately by applying the external force required for this purpose. In one embodiment, the actuating contour has a second contour portion against which the actuating portion abuts in the operating state. Particularly preferably, in the operating state, the actuating portion is held on the second contour portion in such a way that it is locked to it and abuts against it, and as described above with regard to the locking, another locking may be provided alternatively or additionally between the actuating lever and the actuating arm and/or carriage body, which locking can only be released by a release force assigned to this locking, as explained above. Such locking can ensure reliable fixation of the actuating lever relative to the actuating arm and/or relative to the carriage body in the operating state, which can ensure reliable functioning of the sliding bearing in the operating state. Generally preferred, the second contour portion is arranged offset from the first contour portion in the direction of displacement, in particular, in the operating state, the second contour portion is less far away from the first guide portion in the direction of displacement than the first contour portion.

In one embodiment, the actuating lever has a clamping portion, the actuating lever being spaced apart from the rail in the operating state and, starting from the operating state, being rotatable about the bearing axis while achieving a further operating state in which, as explained for the operating state, each of the guide portions is arranged in the guide seat assigned to it and is surrounded by it perpendicularly to the longitudinal direction, the clamping portion of the actuating lever abutting against the rail in pressing contact in the further operating state. In the further operating state, the rail and carriage can basically be arranged relative to one another as explained above for the operating state, but the further operating state differs from the operating state in any case in that, unlike in the operating state, in the further operating state the actuating lever abuts with the clamping portion against the rail under a press-on contact, in particular abuts against the first guide portion of the rail. In the further operating state, sliding of the carriage along the rail in the longitudinal direction is thus inhibited by the press-on contact of the clamping portion against the rail. Thus, in the particularly preferred embodiment described, a braking effect is produced between the rail and the carriage by the clamping portion abutting against the rail. Particularly preferably, the clamping portion is made of plastic. Particularly preferably, the clamping portion is made of such a plastic which, when in contact with the first guide portion of the rail with a contact force, creates a higher frictional resistance than the sliding material from which the sliding element is formed which is described in more detail below. Particularly preferably, the clamping portion is rounded in order to avoid that the rail is scratched by the press-on contact. Particularly preferably, in the further operating state, the actuating lever is held fixed in a fixed rotational position about the bearing axis relative to the carriage body. This fixed holding in the fixed rotational position can be achieved, for example, by a locking between the actuating lever and the carriage body, the actuating arm or the rail or by a corresponding design of the surfaces of the clamping portion and the rail, with which they rest against one another in a press-on contact. The fixed holding or the fixed rotational position can thus preferably only be released by generating an associated release force, with which a rotation of the actuating lever about the bearing axis is only made possible starting from the further operating state, wherein after leaving the further operating state, i.e., after release of the said fixed holding or the fixed rotational position, the actuating lever can be rotated about the bearing axis with a rotational force which is less than the assigned release force. In one embodiment, the further operating state can only be reached, starting from the operating state, by rotating the actuating lever in a defined direction of rotation about the bearing axis and, starting from the further operating state, the operating state can only be reached by rotating the actuating lever about the bearing axis against the defined direction of rotation. In one embodiment, the actuating portion of the actuating lever abuts against a third contour portion of the actuating contour in the further operating state and in another embodiment, the actuating portion is spaced apart from the actuating contour in the further operating state. Generally preferably, in the further operating state, the actuating portion is either spaced from the third contour portion or abuts against the third contour portion with a contact force that is less than the pressing force with which the clamping portion abuts against the rail for generating the press-on contact, the amount of the contact force preferably being less than 50%, in particular less than 20% of the amount of the pressing force. Generally advantageously, the actuating contour has a third contour portion, the actuating portion being arranged along the third contour portion in the further operating state. In the further operating state, the actuating portion thus extends exclusively within a section, in particular relative to the longitudinal direction, across which the third contour portion extends, whereas in the operating state, the actuating portion extends exclusively within a section, in particular relative to the longitudinal direction, across which the second contour portion extends, and wherein, when the first guide seat is open for removal of the assigned first guide portion or in the mounting state, the actuating portion extends exclusively within a section, in particular relative to the longitudinal direction, across which the first contour portion extends. Generally preferably, the first, second and third contour portions are arranged offset from one another in the longitudinal direction. Particularly preferably, the second contour portion is arranged between the first and third contour portions, in particular arranged longitudinally between the first and third contour portions.

In one embodiment, the actuating lever in the operating state points with one side to the rail in a direction perpendicular to the longitudinal direction. This side of the actuating lever which points to the rail perpendicular to the longitudinal direction has an extension in the longitudinal direction. The bearing axis is preferably arranged off-center in the longitudinal direction with respect to this extension length of said side of the actuating lever. This can have the particular advantage that, depending on the direction of rotation about the bearing axis, a different state of the sliding bearing can be achieved in each case. Preferably, the clamping portion of the actuating lever is arranged on a longitudinal end of said side of the actuating lever facing the rail. Particularly preferably, the clamping portion is formed on such a longitudinal end of said side of the actuating lever which in the operating state is further away in the longitudinal direction from the bearing axis or the axis of rotation described above and thus from the center of rotation than the longitudinal end of said side of the actuating lever opposite thereto.

Generally preferably, the first guide seat encloses the first guide portion over a larger angular range than the second guide seat encloses the second guide portion. This may allow easy removal of the second guide portion from the second guide seat when the first guide portion is removed from the first guide seat. Preferably, both angular regions each extend over at least 170° about the guide axis of the respective guide portion. Preferably, the angular range with which the first guide seat encloses the first guide portion extends over at least 200°, in particular at least 220°, in particular at least 240°. The enclosing can, but does not necessarily have to, be uninterrupted over the angular range, however, the enclosing is ensured over the angular range, so that the guide seat forms a movement limitation for the assigned guide portion over the angular range, and at least at the ends of the angular range the guide seat is physically formed.

In one embodiment, the first guide seat is formed by a first receiving part formed by the actuating arm and a second receiving part formed by the carriage body. Preferably, the first receiving part extends along a first transverse side of the first guide portion and the second receiving part extends along a second transverse side of the first guide portion, the transverse sides each facing along the transverse direction, preferably in opposite directions along the transverse direction. Preferably, the first receiving part extends exclusively along the first transverse side. Generally preferably, the first and second receiving parts extend in a same overlapping area on one side of the first guide seat. This can ensure particularly good guidance of the actuating arm and the carriage body relative to one another. Generally preferably, for improved guidance, the first receiving part has a first recess in which a longitudinal portion of the second receiving part extends, the recess and the longitudinal portion preferably being in said overlap region. Preferably, the longitudinal portion of the second receiving part is slidably mounted in the recess of the first receiving part in the course of said displacement of the actuating arm relative to the carriage body while slidingly contacting the region of the first receiving part surrounding the recess.

In one embodiment, a sliding element is arranged in each guide seat, which forms a sliding portion of the guide seat against which, in the operating state, the respectively associated guide portion abuts in sliding contact during a longitudinal displacement of the carriage relative to the rail. The sliding element can, for example, be designed in the manner of a portion of a hollow cylinder which rests with its outer side against an inner side of the respective guide seat and, in the operating state, points with its inner side towards the associated guide portion and abuts against the latter in a sliding manner. The provision and formation of such sliding elements is well known in prior art. Preferably, such sliding elements are made of a sliding material. The sliding material used is advantageously a sliding plastic. In the present context, this is understood to mean a polymeric material which has a lower coefficient of friction with respect to the surface of the guide portion than the material of the carriage body. In particular, this includes the thermoplastics polyethene, polypropylene, polyacetal, polycarbonate, polyamide, polyvinyl chloride, polytetrafluoroethene and, in the case of thermosets, phenolic resins. To further reduce friction, these plastics may contain lubricants, especially fine-particle solid lubricants such as molybdenum disulfide or graphite. Such polymers are also known as tribopolymers. As friction also reduces wear and also abrasion, these products are particularly appropriate where high purity is required, such as in the food and semiconductor industries, and in biochemical and microbiological applications. The polymeric materials may further include fillers and fibrous materials, for example plastic or textile, to improve mechanical properties. Particularly preferably, the sliding element arranged in the second guide seat encloses the second guide portion over a larger angular range in the operating state than the sliding element arranged in the first guide seat encloses the first guide section. Preferably, the angular range with which the sliding element in the second guide seat encloses the second guide portion is at least 140°, in particular at least 160°, whereas the angular range with which the sliding element in the first guide seat encloses the first guide portion is less than 160°, in particular less than 140°. Particularly preferably, the sliding element arranged in the first guide seat is arranged fixed exclusively to the second receiving part formed by the carriage body and preferably also extends exclusively along this second receiving part. Particularly preferably, the first receiving part formed by the actuating arm is made of a sliding material. Preferably, the actuating arm as a whole, in particular integrally in one piece, is made of a sliding material. Particularly preferably, in the operating state, the actuating arm with the first receiving part directly adjoins the first guide section, whereas the sliding element is arranged between the second receiving part and the first guide section. Preferably, the first receiving part has, on its side facing the first guide section, a contour which corresponds to the outer contour of the first guide portion facing it.

In one embodiment, the first receiving part and the second receiving part differ by less than 50% of their longitudinal extent, wherein the specified value of "50%" refers to the longitudinal extent of the second receiving part. This can ensure uniform guidance of the first guide portion in the first guide seat. Preferably, the longitudinal extent of the first guide seat resulting from the longitudinal extent of the two receiving parts differs from the longitudinal extent of the second guide seat by less than 50%, the specified value of "50%" referring to the longitudinal extent of the first guide seat. Preferably, the difference of the respective longitudinal extents is less than 30%, in particular less than 20% of the respective longitudinal extent referred to.

In one embodiment, a transverse recess opens into at least one of the guide seats, wherein the sliding element arranged in the guide seat extends into the transverse recess while defining a position of the sliding element relative to the carriage body. The transverse recess is thus a recess provided on an inner side of the guide seat facing the guide portion in the operating state and thus a recess with respect to portions of the respective guide seat surrounding it. By the sliding element arranged in the guide seat extending into the transverse recess, fixing of the sliding element in any direction in the guide seat can be ensured, namely both in the longitudinal direction and in the direction perpendicular to the longitudinal direction.

Preferably, the sliding element is designed to be elastically deformable and can be inserted into and removed from the guide seat only by elastic deformation and is arranged to engage with a projection into the transverse recess in the described operating state and mounting state of the sliding bearing. Generally preferably, the sliding element has ribs extending along the longitudinal direction, which ribs form the sliding portion of the sliding element with which the sliding element slidingly rests against the associated guide portion in the operating state. Channels extending in the longitudinal direction may be formed between the ribs. The provision of the ribs can ensure a particularly advantageous, low-friction contact of the sliding element against the guide portion, avoiding the influence of contaminants.

Generally preferably, the rail is made of metal, for example as an extruded profile, for example of aluminum. Generally preferably, the carriage is at least partially made of metal, in particular of aluminum, and/or of plastic. In one embodiment, at least the base body of the carriage body, in particular the base body and the fixing body of the carriage body, in particular the entire carriage body, is made of plastic or metal, in particular aluminum. In one embodiment, actuating arm is made of metal, in particular aluminum, or plastic. Particularly preferably, the base body of the carriage body, in particular the entire carriage body, and the actuating arm are made of the same material. In one embodiment, the actuating lever is made of metal, in particular aluminum, or plastic. In one embodiment, the base body of the carriage body, in particular the entire carriage body, the actuating arm and the actuating lever are made of the same material.

The invention further relates to a carriage for a sliding bearing arrangement according to the invention. The carriage has a first and a second guide seat which are each elongated in the longitudinal direction and extend adjacent to one another and which are each designed to receive a guide portion of a rail associated with it in such a way as to surround the latter and thereby fix the carriage to the rail in a longitudinally displaceable manner. The carriage has a carriage body and an actuating arm which together form a first of the guide seats. The actuating arm is fixed to the carriage body so as to be slidably guided with respect thereto perpendicular to the longitudinal direction for enabling opening of the first guide seat by displacing the actuating arm to remove the associated first guide portion from the first guide seat and/or to insert the associated first guide portion into the first guide seat along a removal direction perpendicular to the longitudinal direction.

The invention further relates to the use of a sliding bearing according to the invention. In the use according to the invention, the carriage is mounted on the rail in a longitudinally displaceable manner by first arranging the second guide portion of the rail in the second guide seat of the carriage and then arranging the first guide portion of the rail in the first guide seat of the carriage. In doing so, the guide portions are each inserted perpendicularly to the longitudinal direction into the guide seat assigned to them in each case, and the actuating arm of the carriage is moved in a displacement direction running perpendicularly to the longitudinal direction, starting from a rest position, with the first guide seat being opened to such an extent that the first guide portion of the rail can be inserted into the first guide seat perpendicularly to the longitudinal direction. After both guide portions have been arranged in their respectively assigned guide seats, the actuating arm is moved against the direction of displacement while fixing the carriage relative to the rail perpendicular to the longitudinal direction.

The sliding bearing according to the invention, the carriage according to the invention and the use according to the invention can each have features which are described in connection with sliding bearings of the kind described. Further, various embodiments according to the invention may each have features described in connection with other embodiments according to the invention.

One embodiment of the invention will now be described in more detail below with reference to three drawing figures wherein it is shown by:

FIG. 1 schematic representations of one embodiment of a sliding bearing according to the invention in various states;

FIG. 2 views of one embodiment of a sliding bearing according to the invention in various states in various schematic representations;

FIG. 3 various views of the embodiment according to FIG. 1 in the mounting state in various schematic representations;

FIG. 4 a further embodiment of a sliding bearing according to the invention in various states in various schematic representations;

FIG. 5 various views on various components of the embodiment according to FIG. 4 in various schematic representations.

Figure 1C:
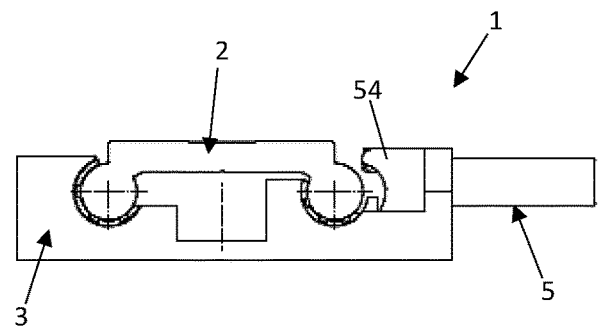
Figure 1D:
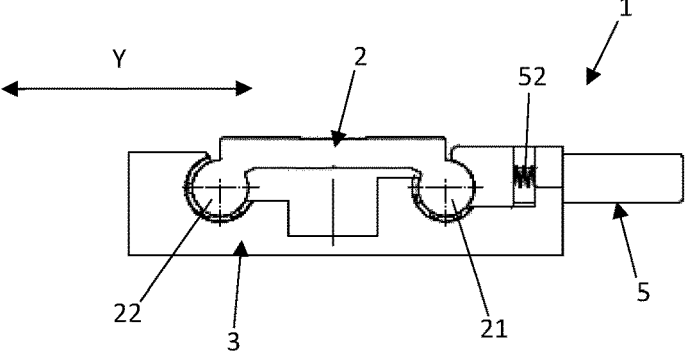

In FIG. 1, which comprises FIGS. 1a, 1b, 1c and 1d, one embodiment of a sliding bearing 1 according to the invention is shown in various states. The sliding bearing 1 comprises a rail 2 and a carriage 3. The rail 2 has two guide portions 21, 22 extending in an elongate manner in a longitudinal direction X, each of which has a cylindrical configuration. In FIG. 1, the guide axes of the guide portions 21, 22 are indicated by crosses. The two guide portions 21, 22 run side by side in a transverse direction Y which is perpendicular to the longitudinal direction X and are spaced apart from one another in the transverse direction Y. The transverse direction Y is drawn in FIG. 1d of FIG. 1, since FIG. 1d shows the operating state of the sliding bearing 1 in which the carriage 3 is held fixed in position relative to the rail 2 perpendicular to the longitudinal direction X and thus also relative to the transversal direction Y, so that the transversal direction Y is fixed for both the rail 2 and the carriage 3. The carriage 3 has a first guide seat 31, which is designed to correspond to the first guide portion 21 of the rail 2, and a second guide seat 32, which is designed to correspond to a second guide portion 22 of the rail 2. The guide seats 31, 32 are each designed in the manner of a hollow cylinder, which has in its cylinder jacket the side opening shown in FIG. 1 for each of the guide seats 31, 32. The web portions of the rail 2 extend through this side opening in the operating state, as shown in FIG. 1d, by which web portions the guide portions 21, 22 are connected to the rail body of the rail 2. The carriage 3 has a carriage body comprising a base body 34 and fixing body 35. As can also be seen in particular from FIGS. 2 and 3, the fixing body 35 is attached to the base body 34 by screws 36. The base body 34 and the fixing body 35 together form a guide for the actuating arm 5, which has an actuating handle 51 projecting beyond the carriage body in any state of the sliding bearing 1 and a first receiving part 54. The first receiving part 54 forms part of the first guide seat 31. The guide seat 31 is further formed by a second receiving part formed by the base body 34 of the carriage body. In the present case, the actuating arm 5 is formed in one piece and is made of a sliding material. In the operating state shown in FIG. 1d, the first receiving part 54 of the actuating arm 5 directly adjoins the first guide portion 21 of the rail 2, whereas a first sliding element 41 is provided between the second receiving part, which is formed by the base body 34, and the first guide portion 21. Correspondingly, a second sliding element 42 is provided between the second guide seat 32 and the second guide portion 22. In the operating state shown in FIG. 1d, the carriage 3 is thus guided on the rail 2 so as to be displaceable with low friction in the longitudinal direction X, while it is held on the rail 2 in a fixed position perpendicular to the longitudinal direction X. This is helped by the fact that the guide sections 21, 22 can bear against the walls of the guide seats 31, 32 limiting them and can slide along them with low friction exclusively via a sliding material.

From the sequence of FIGS. 1a to 1d, the function of the described embodiment of the sliding bearing according to the invention is readily apparent. The actuating arm 5 is mounted so as to be displaceable relative to the carriage body along a displacement direction. It can move along the displacement direction relative to the carriage body between a first stop, where it abuts against in FIG. 1c, and a second stop, which is shown in FIG. 1c, but where it abuts against in FIGS. 1a, 1b and 1d. The stops are formed by the carriage body. In this connection, the first-mentioned stop is formed by the fixing body 35 and the further stop 33 is formed by the base body 34, which is generally advantageous according to the invention. In the operating state shown in FIG. 1d, the actuating arm 5 abuts against the further stop 33 and is held pressed against this stop 33 by the spring device 52 that acts on it along the direction of displacement. In the operating state, the carriage 3 is not removable from the rail 2 perpendicular to the longitudinal direction X. However, the actuating arm 5 can be moved along the displacement direction relative to the carriage body until it abuts against the other stop 33, as shown in FIG. 1c, thereby opening the first guide seat 31 to such an extent that the first guide portion 21 can be moved out of it by rotating the carriage 2 about the guide axis of the second guide portion 22, as can be seen from the combined view of FIGS. 1c and 1b. Subsequently, as can be seen from the combined view of FIGS. 1b and 1a, the carriage 3 is removable from the rail 2 by removing the second guide portion 22 from the second guide seat 32.

Figure 2A:
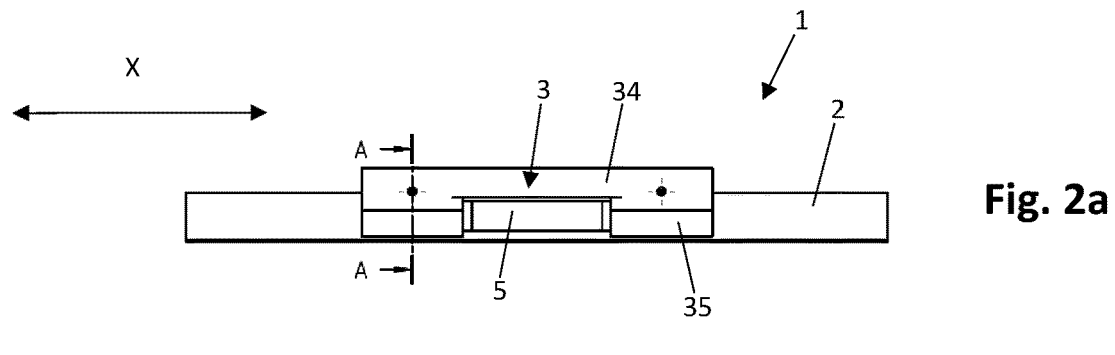
Figure 2B:
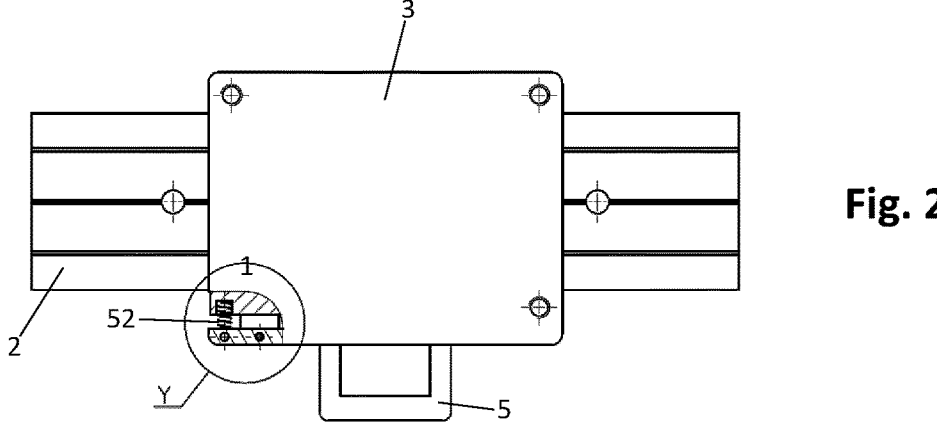
Figure 2C:
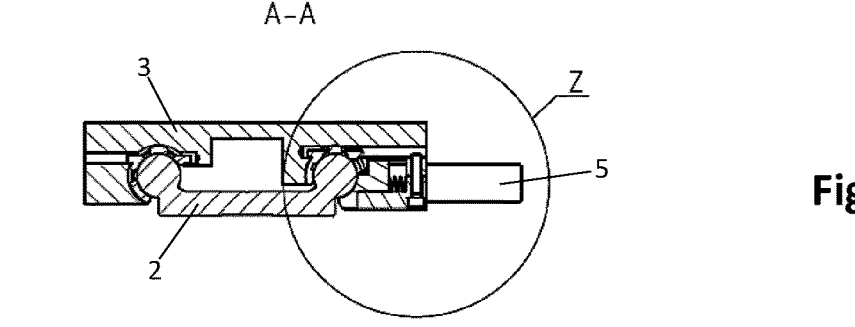
Figure 2D:
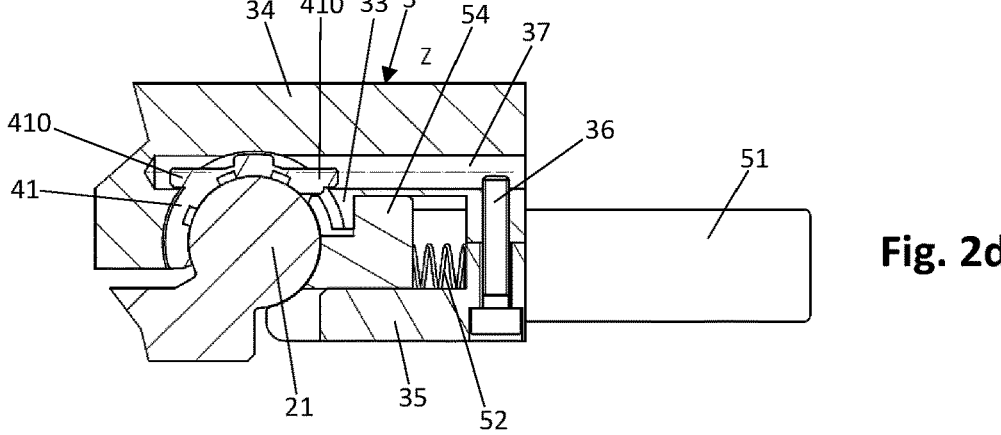
Figure 3A:
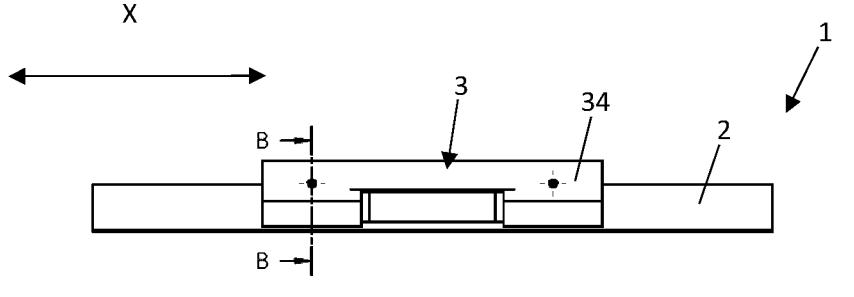
Figure 3B:
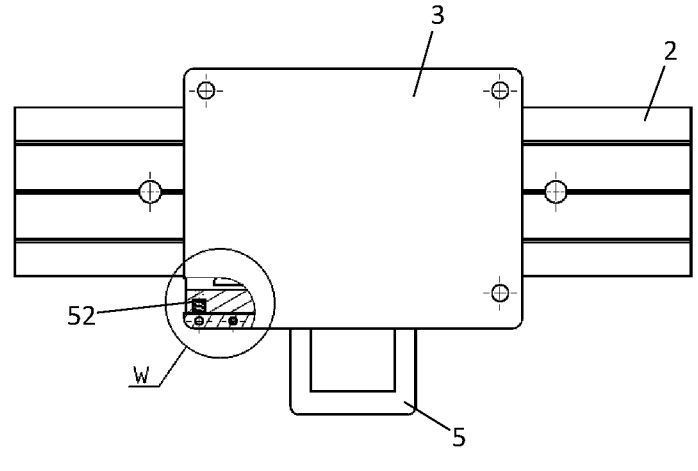
Figure 3C:
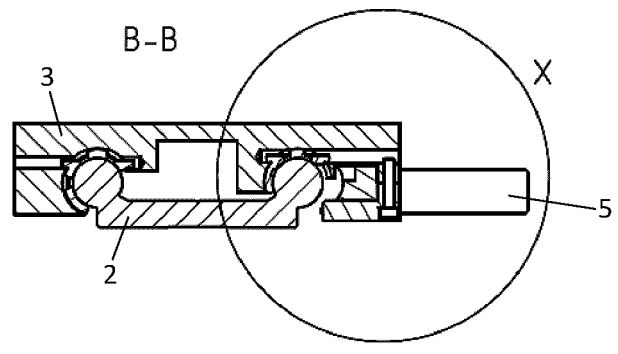
Figure 3D:
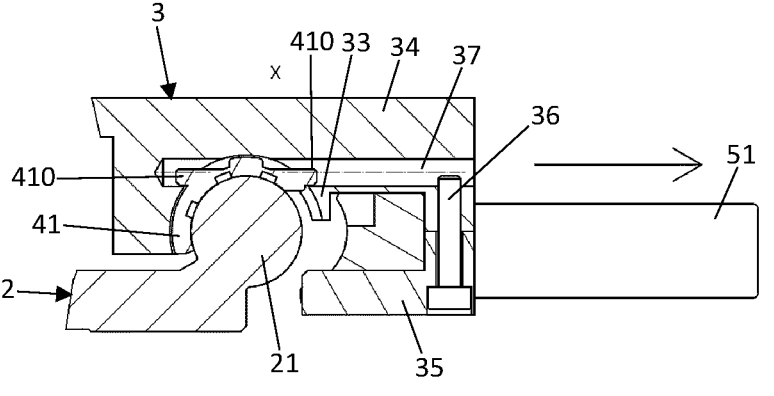

FIG. 2, which comprises FIGS. 2, 2b, 2c and 2d, shows various views of the embodiment of the sliding bearing 1 according to FIG. 1 in the operating state. FIGS. 2a and 2b show views of the sliding bearing 1 from different directions. FIG. 2c shows section A-A as drawn in FIG. 2a, and FIG. 2d shows an enlargement of this section. From FIG. 2 it can be seen that a transverse recess 37 opens into the first guide seat 31, which recess is provided in the base body 34 and is designed as a bore, which is generally advantageous according to the invention. The first sliding element 41 engages in this transverse recess 37 with projections 410, as a result of which the sliding element 41 is held in a fixed position on the base body 34 both along the longitudinal direction X and perpendicularly to the longitudinal direction X. Furthermore, it can be seen that the first sliding element 41 has ribs extending in the longitudinal direction X, with channels formed between said ribs. The first receiving part 54 formed by the actuating arm 5, which receiving part is manufactured integrally in one piece with the actuating handle 51, is held in the operating state pressed against the further stop 33 by the spring device 52 and at the same time almost abuts against the first guide portion 21; according to the invention, it is generally preferred that it is spaced from the first guide portion 21 by less than 0.1 mm in the operating state.

In FIG. 3, which comprises FIGS. 3a, 3b, 3c and 3d, the embodiment according to FIG. 1 is shown in the mounted state, wherein the views of FIGS. 3a, 3b, 3c and 3d correspond to the views of FIGS. 2a, 2b, 2c and 2d. From the comparison between FIGS. 2 and 3 it can be seen that in order to achieve the mounting state based on the operating state, the actuating arm 5 is moved along the displacement direction relative to the carriage body, whereby it is pressed against the stop formed by the base body 35. This displacement movement is possible only by overcoming the spring force applied by the spring device 52. In the mounted state, the first guide seat 31 is opened to such an extent that the first guide portion 21 can be removed from it, as explained in FIG. 1.

Figures 4A, 4B:
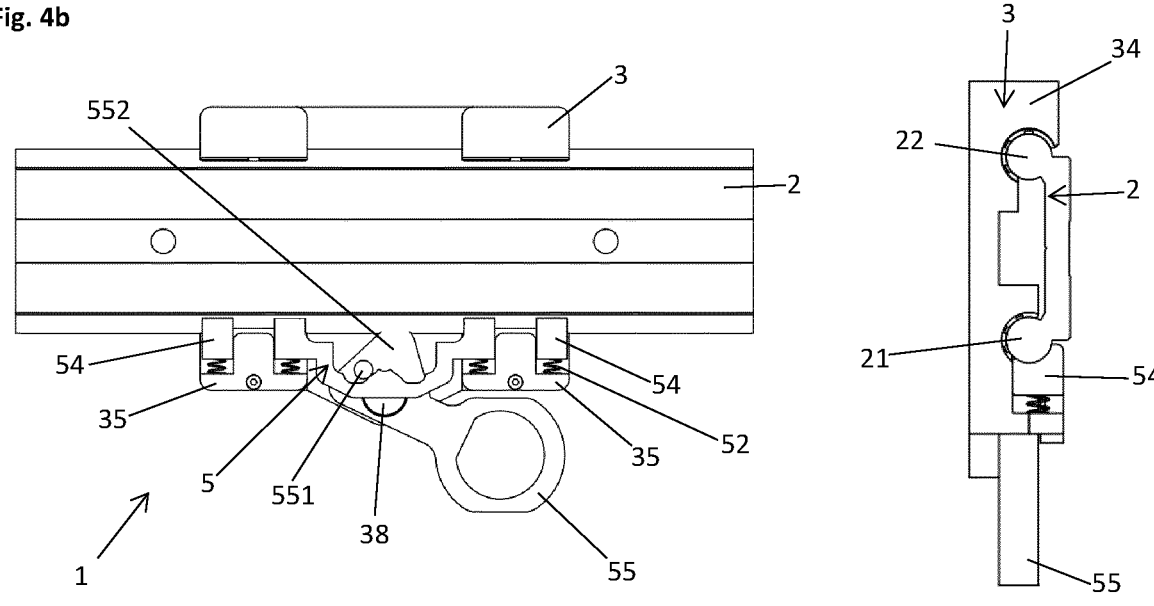
Figure 4C:
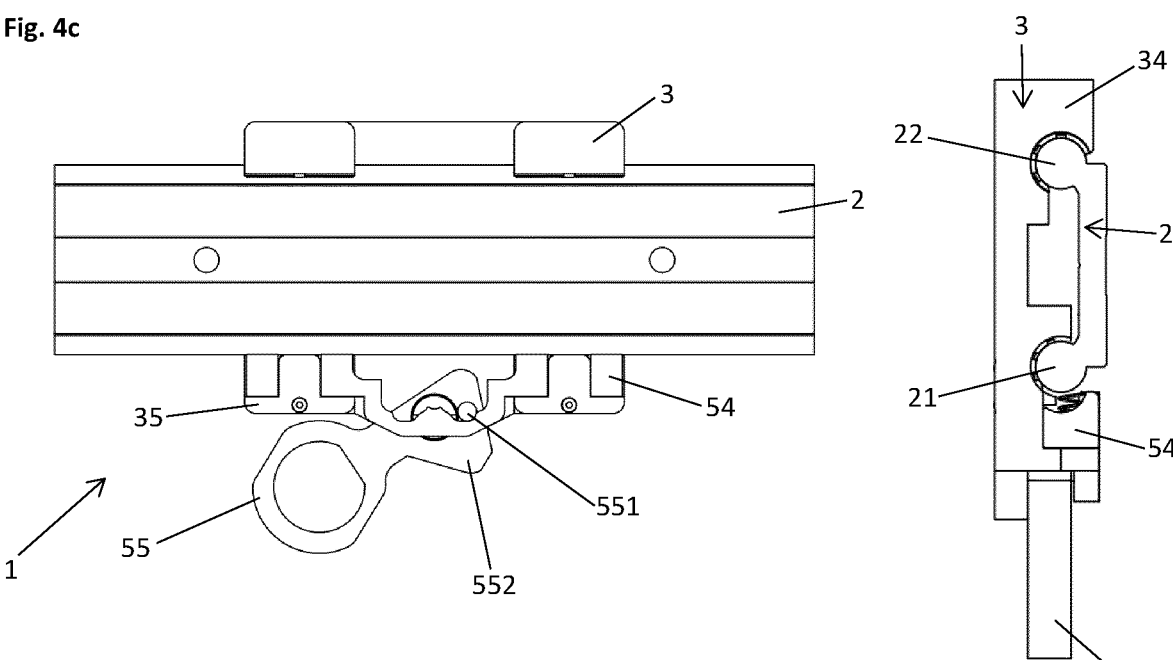
Figure 5A:
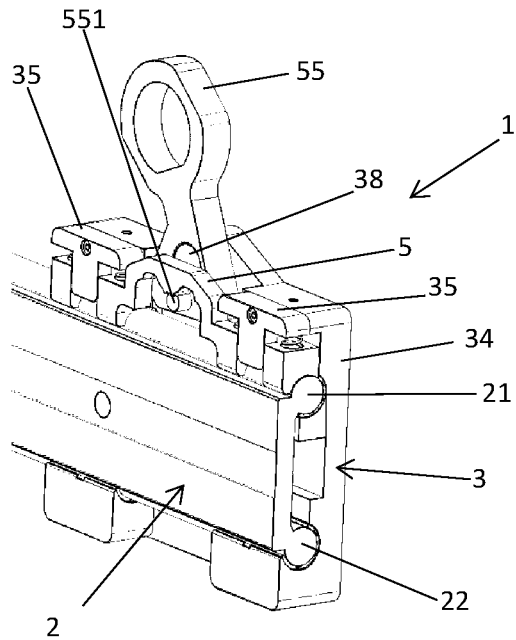
Figure 5B:
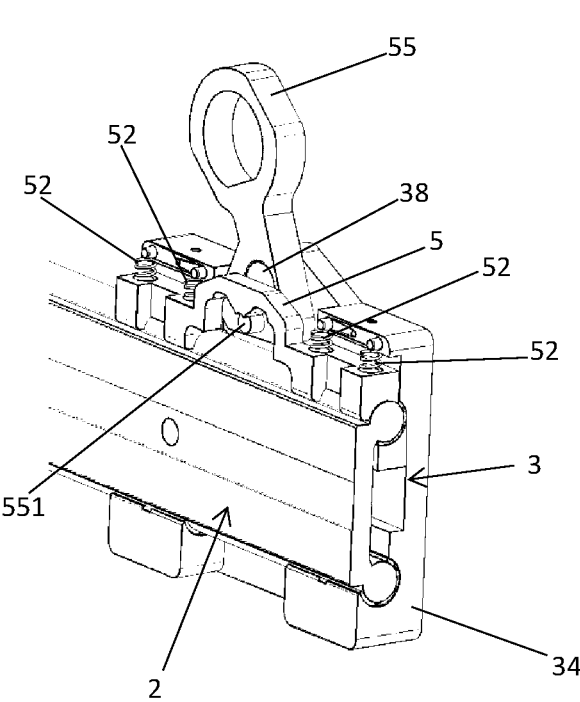
Figure 5C:
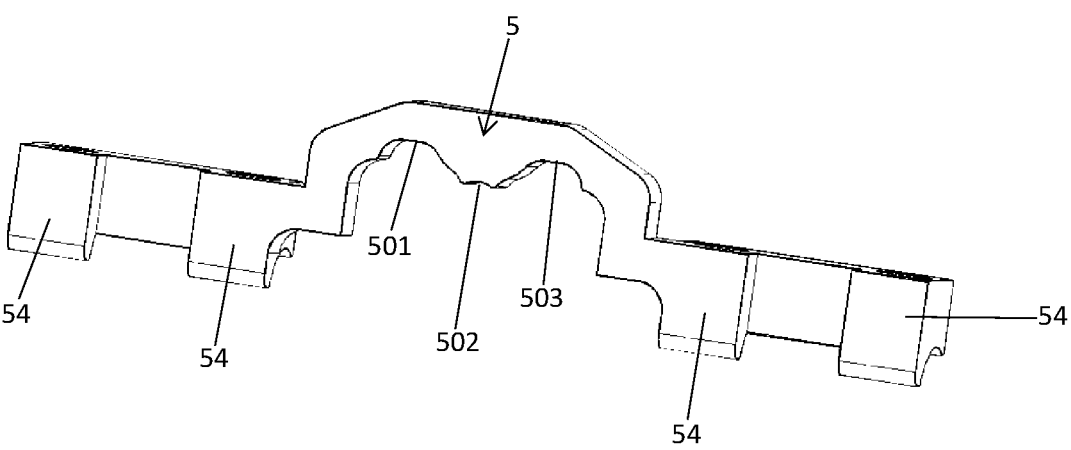

In FIG. 4, which comprises FIGS. 4a, 4b and 4c, views of a further embodiment of a sliding bearing 1 according to the invention in various states are shown in various schematic representations. In FIG. 4a, the sliding bearing 1 is shown in the operating state, in FIG. 4b in a further operating state and in FIG. 4c in the mounting state. In FIG. 5, which comprises the FIGS. 5a, 5b and 5c, various views on the sliding bearing 1 or on the components of the sliding bearing 1 are shown in schematic representations in order to illustrate the properties of the sliding bearing 1 according to FIG. 4. In the following, FIGS. 4 and 5 are described together for the purpose of explaining the embodiment shown in FIGS. 4 and 5.

The sliding bearing 1 according to FIGS. 4 and 5 comprises a rail 2, which is substantially analogous to the rail 2 of the embodiment according to FIG. 1. The carriage 3 has a carriage body comprising a base body 34 and a fixing body 35, wherein in the present case, the fixing body 35 is formed in two parts and thus comprises two parts which are spaced apart from one another in the longitudinal direction X. The fixing body 35, i.e., all its parts, are fastened to the base body 34 by screws. The carriage 3 further comprises an actuating arm 5 that is captively held on the base body 34 by the fixing body 35. A guide device is provided between the actuating arm 5 and the carriage body, by means of which the actuating arm 5 is fixed to the carriage body so that it is guided in a displaceable manner over a displacement path extending in the transverse direction Y. The guide device is formed by a first guide part of the carriage body, which is formed jointly by the base body 34 and the fixing body 35 of the carriage body, and by a second guide part of the actuating arm 5. The configuration of the guide device can be seen in particular from the combined view of FIGS. 5a, 5b and 5c. While in FIG. 5a the sliding bearing 1 is shown as a whole, FIG. 5b shows the sliding bearing 1 without the fixing body 35 compared to FIG. 5a, while FIG. 5c shows the actuating arm 5 alone. From the combined view of these figures it can be seen that the actuating arm 5, as the second guide part of the guide device, forms grooves in which the parts of the fixing body 35 engage as springs, the actuating arm 5 being fixed in its position in the longitudinal direction X by the engagement of the springs in the grooves and being fixed in its position in a direction perpendicular to the longitudinal direction X and transverse direction Y by the interaction of the base body 34 and the fixing body 35 and being supported so as to be guided in a displaceable manner in the transverse direction Y relative to the carriage body. The guide device forms a stop and an additional stop that form the two ends of the displacement path over which the actuating arm 5 is movable in the transverse direction Y relative to the carriage body in the direction of displacement, i.e., in the present case in the transverse direction Y. In the mounting state shown in FIG. 4c, the actuating arm 5 abuts against the stop of the guide device, and in the operating state shown in FIG. 4a, the actuating arm 5 abuts against the additional stop of the guide device. In the present case, the contact is made indirectly via the actuating lever 55 which is surrounded further by the carriage 3.

The actuating lever 55, with which the carriage 3 of the embodiment of a sliding bearing 1 shown in FIGS. 4 and 5 is provided, is supported on the carriage body on a bearing axis 38 of the carriage body so as to be rotatable about the bearing axis 38. Both in the operating state shown in FIG. 4a and in the further operating state shown in FIG. 4b and in the mounting state shown in FIG. 4c, the actuating lever 55 is movable relative to the carriage body solely by rotation about the bearing axis 38 and is otherwise fixed relative to the carriage body, which is generally advantageous according to the invention. The actuating lever 55 has an actuating portion 551, and the actuating arm 5 has an actuating contour with contour portions 501, 502, 503. In the operating state shown in FIG. 4a, the actuating lever 55 is spaced apart from the rail 2. The actuating lever 55 has a side facing toward the first guide portion 21 of the rail 2 in the transverse direction Y. As can be seen from the combined view of FIGS. 4a, 4b and 4c, this side of the actuating lever 55 has an extension length in the longitudinal direction X, with the bearing axis 38 being arranged eccentrically with respect to the longitudinal direction X within the extension length. A longitudinal end of this side thereby forms a clamping portion 552 of the actuating lever 55.

Thus, various functions are achieved with the actuating lever 55: In the operating state shown in FIG. 4a, the actuating lever 55 is held fixed with its actuating portion 551 locked to the second contour portion 502 of the actuating contour of the actuating arm 5. Starting from the operating state, the actuating lever 55 can be rotated in a first direction about the bearing axis 38 to achieve the further operating state shown in FIG. 4b. As schematically indicated in FIG. 4b, on its side facing the rail 2 on the longitudinal end forming the clamping portion 552, the actuating lever 55 is provided with an excess dimension, so that in the further operating state the clamping portion 552 is held pressed against the first guide portion 21 of the rail 2 with a pressing force acting in the transverse direction Y. This pressing force is built up by the actuating lever 55 between the bearing axis 38 of the carriage 3 and the first guide portion 21 of the rail 2, which is generally advantageous according to the invention. In this further operating state, the pressing contact of the clamping portion 552 causes inhibition of a relative movement between the carriage 3 and the rail 2 in the longitudinal direction X. Thus, in the further operating state, the carriage 3 can be fixed in position to the rail 2 in any respect, which is generally advantageous according to the invention. The position of the carriage 3 thus fixed relative to the rail 2 can only be changed, starting from the further operating state shown in FIG. 4*b*, if the actuating lever is turned back about the bearing axis 38 in a direction in which it is to be turned from the further operating state in order to achieve the operating state, or by generating a quite considerable relative force between the carriage 3 and the rail 2 in the longitudinal direction, which relative force is not normally provided and intended. On the other hand, the actuating lever 55 can be used to achieve the mounting state shown in FIG. 4*c*, starting from the operating state shown in FIG. 4*a*, by rotating it about the bearing axis 38 in the opposite direction, i.e., opposite to the rotation required to achieve the further operating state. Upon such rotation, the actuating portion 551 slides along the actuating contour of the actuating arm 5, thereby generating a relative force between the carriage body and the actuating arm 5 in the transverse direction Y, by which force the actuating arm 5 is displaced relative to the carriage body in the transverse direction Y until the mounting state shown in FIG. 4*c* is reached. In this mounting state, the actuating arm 5 abuts against a stop formed by the guide device, and the actuating portion 551 is held at a first contour portion 501 on this contour portion 501, the first contour portion 501 exerting a restoring force on the actuating portion 551 and thus on the actuating lever 55 due to the spring device 52. Thus, the mounting state as shown in FIG. 4*c* is achieved such that it can be maintained only by applying an external force to the actuating lever 55, wherein when this external force is removed by the action of the spring device 52 while rotating the actuating lever 55 about the bearing axis 38, the operating state as shown in FIG. 4*a* can be automatically achieved again, starting from the mounting state, which is generally advantageous according to the invention.

LIST OF REFERENCE SIGNS 1 sliding bearing
2 rail
3 carriage
5 actuating arm
21 guide portion
22 guide portion
31 first guide seat
32 second guide seat
33 stop
34 base body
35 fixing body
36 screw
37 first transverse recess
38 bearing axis
41 first sliding element
42 second sliding element
51 actuating handle
52 spring device
54 first receiving part
55 actuating lever
410 projection
501 contour portion
502 contour portion
503 contour portion
551 actuating portion
552 clamping portion X longitudinal direction
Y transverse direction
The invention claimed is:

1. A carriage (3) for a sliding bearing (1), wherein the carriage (3) has a first and a second guide seat (31, 32) that are each elongated in a longitudinal direction (X) and extend next to one another, wherein the first guide seat is designed to receive, in an operating state, a first guide portion (21) of a rail (2), and the second guide seat is designed to receive, in said operating state, a second guide portion (22) of the rail (2), the first and second guide seat surrounding the respective one of the first and second guide portion and thereby fixing the carriage (3) to the rail in a longitudinally displaceable manner, wherein the carriage (3) has a carriage body and an actuating arm (5) which together form the first guide seat (31), the actuating arm (5) being fixed to the carriage body so as to be guided displaceably with respect thereto perpendicularly to the longitudinal direction (X) in order to enable opening of the first guide seat (31) by displacing the actuating arm (5) for removing the first guide portion (21) from the first guide seat (31, 32) or for introducing the first guide portion (21) into the first guide seat (31) along a removal direction running perpendicular to the longitudinal direction (X), wherein a guide device forms a stop which defines an end of a displacement path, the actuating arm (5) being displaceable relative to a base body (34) of the carriage body along the displacement path, starting from the operating state, until the stop is reached and forming an opening of the first guide seat, out of which the first guide portion is removeable, when the actuating arm (5) rests against the stop.

2. A sliding bearing (1) comprising
a carriage (3) according to claim 1, wherein the first and second guide portions (21, 22) of the rail (2) are elongated in the longitudinal direction (X) and extend next to one another, and
wherein the rail has a rail body and the first and second guide portions are each connected to the rail body via a first and second web portion, respectively, and the first and second guide seats each having a side opening which is continuous in the longitudinal direction and through which, in the operating state, the respective one of the first and second web portions extend, and
wherein in the operating state each of the first and second guide portions (21, 22) is arranged in the first and second guide seat (31, 32), respectively, and is surrounded by the respective guide seat perpendicularly to the longitudinal direction (X) while fixing the carriage (3) relative to the rail (2) perpendicularly to the longitudinal axis (X) and while ensuring longitudinal displaceability of the carriage (3) relative to the rail (2).

3. The sliding bearing (1) according to claim 2, wherein the carriage body comprises the base body (34) and a fixing body (35) which are detachably fixed to one another, the actuating arm being separable from the carriage body only after the base body (34) and the fixing body (35) have been detached from one another.

4. The sliding bearing (1) according to claim 2, wherein the guide device is formed by the base body (34) and the fixing body (35), wherein the guide device is a linear guide device along a transverse direction (Y) running perpendicular to the longitudinal direction (X).

5. The sliding bearing (1) according to claim 2, wherein when the actuating arm (5) abuts against the stop, an opening is formed in the first guide seat (31) through which the first guide portion (21) is removable, the first and second guide seats (31, 32) and the first and second guide portions (21, 22) being designed to correspond to one another in such a way that the second guide portion (22) can be removed from the second guide seat (32) perpendicular to the longitudinal direction only after the first guide portion (21) has been removed from the first guide seat (31).

6. The sliding bearing (1) according to claim 2, wherein the first and second guide portions (21, 22) each extend along a respective guide axis extending in the longitudinal direction (X), wherein, when an abutment of the actuating arm (5) against the stop of the guide device is achieved, starting from the operating state, the second guide portion (22) is supported for rotation about the respective guide axis in the second guide seat (32), and the first guide portion (21) is removable from the first guide seat (31) by rotation of the carriage (3) about the guide axis of the second guide portion (22).

7. The sliding bearing (1) according to claim 2, wherein the first and second web portions of the rail have a smaller width in a direction perpendicular to the longitudinal direction (X) than the first and second guide portions (21, 22), wherein the side opening of the first guide seat (31, 32), in the operating state, has a width smaller than the width of the first guide portion (31), wherein when the actuating arm (5) abuts against the stop of the guide device, the width of the side opening is at least the width of the first guide portion (21).

8. The sliding bearing (1) according to claim 2, wherein the guide device comprises a spring device (52) which acts on the actuating arm (5) relative to the base body (34) with a spring force directed away from the stop along the displacement path.

9. The sliding bearing (1) according to claim 2, wherein the guide device has a further stop (33) which defines an end of the displacement path opposite the end defined by the stop.

10. The sliding bearing (1) according to claim 2, wherein the carriage (3) comprises an actuating lever (55) supported on the carriage body for rotation about a bearing axis (38), wherein the actuating arm (5) is displaceable by the actuating lever (55), starting from the operating state, by rotating the actuating lever (55) about the bearing axis (38) for enabling opening of the guide seat (31, 32).

11. The sliding bearing (1) according to claim 10, wherein the actuating arm (5) has an actuating contour and the actuating lever (55) has an actuating portion (551) corresponding to the actuating contour, the actuating portion (551) being movable along the actuating contour by rotating the actuating lever (55) about the bearing axis (38), the actuating portion (551) abutting against a first contour portion (501) of the actuating contour when the first guide seat (31, 32) is opened to remove the first guide portion (21, 22).

12. The sliding bearing according to claim 11, wherein the actuating contour has a second contour portion (502) the actuating portion (551) abuts against in the operating state.

13. The sliding bearing according to claim 12, wherein the actuating contour has a third contour portion (503), the actuating portion (551) being arranged along the third contour portion (503) in the further operating state, the second contour portion (502) being arranged between the first and third contour portions (501, 503).

14. The sliding bearing according to claim 10, wherein the actuating lever (55) has a clamping portion (552), the actuating lever being spaced from the rail (2) in the operating state and, starting from the operating state, being rotatable about the bearing axis (38) while achieving the further operating state in which each of the first and second guide portions (21, 22) is arranged in the respective one of the first and second guide seat (31, 32) and is surrounded by the respective one of the first and second guide seat perpendicularly to the longitudinal direction (X), and the clamping portion (552) of the actuating lever (55) abuts against the rail (2) in pressing contact, in the further operating state, the actuating lever (55) is held fixed in a fixed rotational position about the bearing axis (38) relative to the carriage body.

15. The sliding bearing according to claim 10, wherein in the operating state, the actuating lever (55) faces the rail (2) with one side perpendicular to the longitudinal direction (X), this side of the actuating lever (55) having an extension length in the longitudinal direction (X) and the bearing axis (38) being arranged eccentrically with respect to this extension length in the longitudinal direction (X).

16. The sliding bearing (1) according to claim 2, wherein the first guide seat (31) surrounds the first guide portion (21) over a larger angular range than the second guide seat (32) surrounds the second guide portion (22).

17. The sliding bearing (1) according to claim 2, wherein the first guide seat (31) is formed by a first receiving part (54) formed by the actuating arm (5) and a second receiving part formed by the carriage body,
    wherein
        the first receiving part (54) extends on a first transverse side of the first guide portion (21) and the second receiving part extends on a second transverse side of the first guide portion (21) and/or
        the first receiving part (54) has a recess in which a longitudinal portion of the second receiving part extends.

18. The sliding bearing (1) according to claim 17, wherein a sliding element (41, 42) is arranged in each of the first and second guide seat (31, 32) and forms a sliding portion of the respective one of the first and second guide seat (31, 32), against which sliding portion the respective guide portion of the first and second guide portion (21, 22) abuts in a sliding manner in the operating state during a longitudinal displacement of the carriage (3) relative to the rail (2).

19. The sliding bearing (1) according to claim 18, wherein in the first guide seat (31), the sliding element (41) is arranged exclusively on the second receiving part, wherein the first receiving part (54) is made of a sliding material.

20. The sliding bearing (1) according to claim 18, wherein a transverse recess (37) opens into at least one of the first and second guide seats (31, 32), the sliding element (41, 42) arranged in the at least one of the first and second guide seat (31, 32) extending into the transverse recess (37) while fixing a position of the sliding element (41, 42) relative to the carriage body.

21. The sliding bearing (1) according to claim 17, wherein the first receiving part (54) and the second receiving part differ in their longitudinal extension by less than 50%, reference being made to the longitudinal extension of the second receiving part.

22. A use of the sliding bearing (1) according to claim 2, wherein the carriage (3) is mounted on the rail (2) in the longitudinally displaceable manner by first arranging the second guide portion (22) of the rail (2) in the second guide seat (32) of the carriage (3) and then arranging the first guide portion (21) of the rail (2) in the first guide seat (31) of the carriage (3), the first and second guide portions (21, 22) each being inserted respectively into the first and second guide seat (31, 32) perpendicular to the longitudinal direction (X), and the actuating arm (5) of the carriage (3) being moved in the displacement direction running perpendicularly to the longitudinal direction, starting from a rest position, while opening the first guide seat (31) to such an extent that the first guide portion (21) of the rail (2) is insertable into the first guide seat (31) perpendicularly to the longitudinal direction, wherein, after the first and second guide portions (21, 22) have been arranged respectively in the first and second guide seats (31, 32), the actuating arm (5) is moved counter to the displacement direction while fixing the carriage (3) relative to the rail (2) perpendicularly to the longitudinal direction (X).

* * * * *